United States Patent
Toyonaga et al.

(10) Patent No.: US 6,222,149 B1
(45) Date of Patent: Apr. 24, 2001

(54) POWER SUPPLY DEVICE FOR ELECTRIC DISCHARGE MACHINING APPARATUS

(75) Inventors: Tatsuo Toyonaga; Yuji Kaneko; Daisuke Sadamitsu, all of Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/325,738

(22) Filed: Jun. 4, 1999

(30) Foreign Application Priority Data

Jun. 10, 1998 (JP) .................................................. 10-176540
Jun. 10, 1998 (JP) .................................................. 10-176541

(51) Int. Cl.$^7$ .................................................. B23H 1/02
(52) U.S. Cl. ...................................... 219/69.13; 219/69.18
(58) Field of Search ............................. 219/69.13, 69.18; 323/222, 282

(56) References Cited

U.S. PATENT DOCUMENTS

| 5,149,931 | 9/1992 | Magara | 219/69.13 |
| 5,317,122 | * 5/1994 | Ito et al. | 219/69.18 |
| 5,416,290 | * 5/1995 | Magara et al. | 219/69.18 |
| 5,869,797 | 2/1999 | Goto et al. | 219/69.13 |
| 5,874,703 | 2/1999 | Derighetti et al. | 219/69.18 |
| 5,986,232 | * 11/1999 | Kaneko et al. | 219/69.18 |

FOREIGN PATENT DOCUMENTS

| 1013371 | * 8/1957 | (DE) | 219/69.13 |
| 268934 | * 6/1988 | (EP) | 219/69.13 |
| 61-4620 | 4/1996 | (JP) . | |
| 1710233 | * 2/1992 | (SU) | 219/69.18 |

* cited by examiner

Primary Examiner—Geoffrey S. Evans
(74) Attorney, Agent, or Firm—McDermott, Will & Emery; Paul Devinsky

(57) ABSTRACT

A power supply device for electric discharge machining apparatus, for supplying power to a gap formed between a workpiece and a tool electrode comprises a d.c. power source, a bridge circuit supplied with d.c. voltage from the d.c. power source and having switching transistors provided on each side, and a control circuit for controlling the on/off switching operation of switching transistors of the bridge circuit so that a.c. voltage pulses are applied from the bridge circuit to the gap. A first resistor limits current flowing when the workpiece is negatively poled and the tool electrode is positively poled. A second resistor having a larger value than the first resistor limits current flowing when the workpiece is positively poled and the tool electrode is negatively poled.

2 Claims, 4 Drawing Sheets

FIG. 1
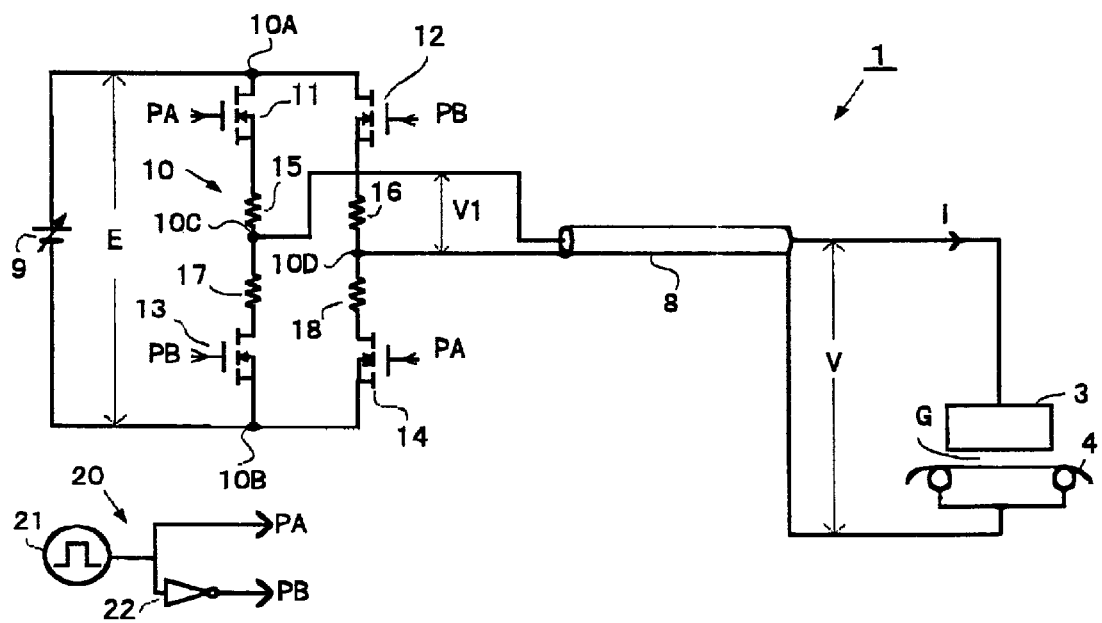
FIG. 2A PB
FIG. 2B PA
FIG. 2C V
FIG. 2D I
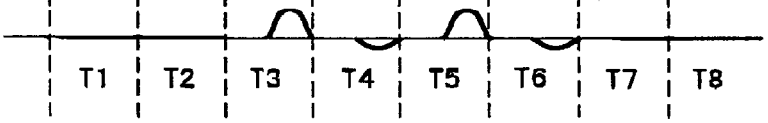
FIG. 3
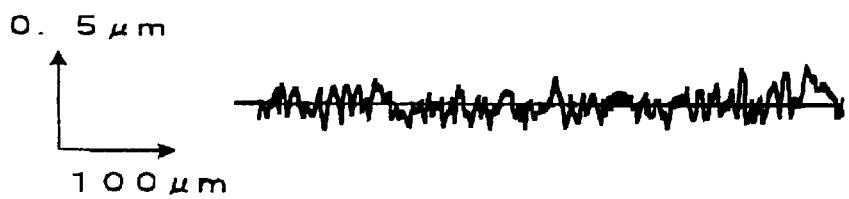

FIG. 4
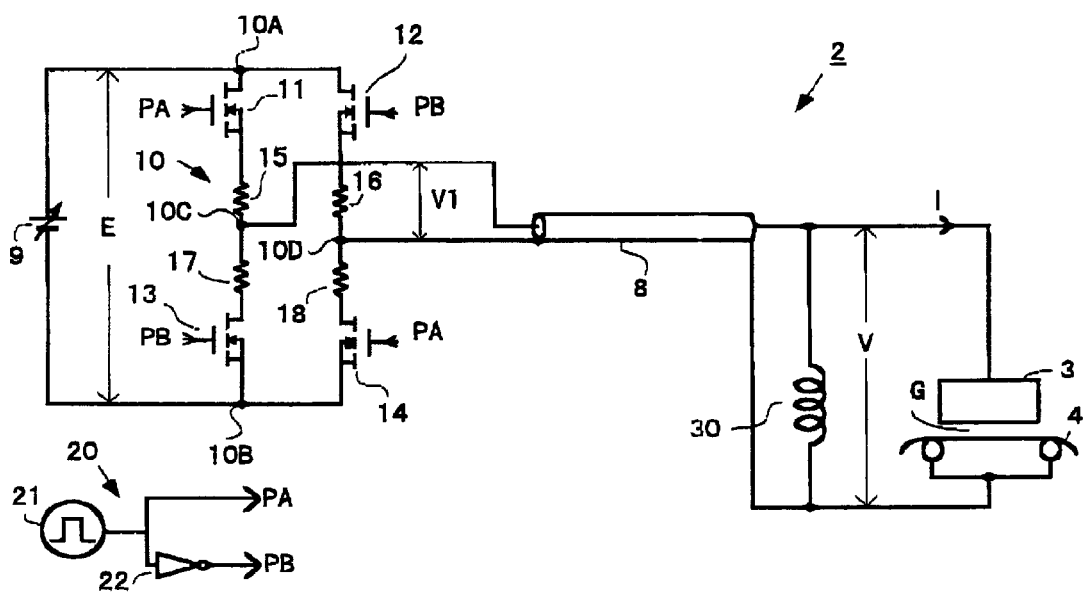
FIG. 5A  PB 
FIG. 5B  PA 
FIG. 5C  V 
FIG. 5D  I 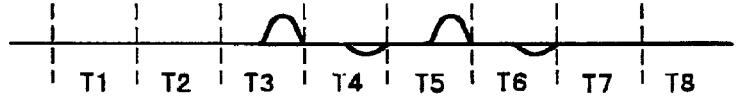

FIG. 6
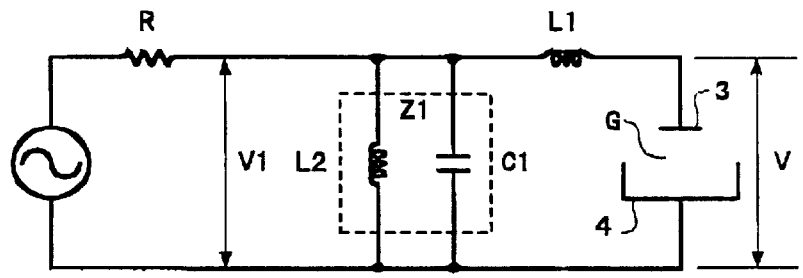
FIG. 7A
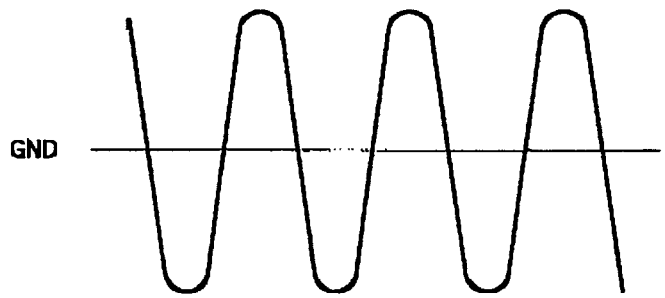
FIG. 7B
FIG. 8
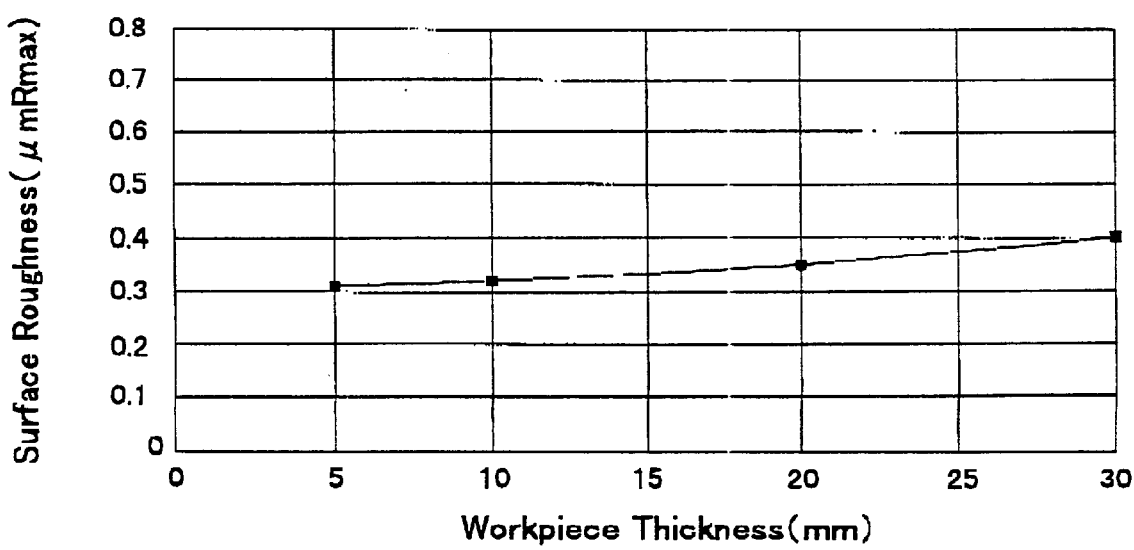

POWER SUPPLY DEVICE FOR ELECTRIC DISCHARGE MACHINING APPARATUS

FIELD OF THE INVENTION

The present invention relates to an electric discharge machining apparatus for machining a workpiece by applying electrical pulses to a machining gap formed between the workpiece and a tool electrode, and particularly to an electric discharge machining apparatus provided with a switching circuit for generating high frequency a.c. voltage pulses from a d.c. power supply.

BACKGROUND OF THE INVENTION

When power is applied from a d.c. or a.c. power supply to a small gap formed between a tool electrode of an electric discharge machining apparatus and a conductive workpiece, simply known as a "gap", the resistance of dielectric fluid across the gap is reduced. Then, when the insulation properties of the dielectric fluid are broken down, electric discharge is generated and "on-time" begins. During a controlled on-time, discharge current flows through the gap resulting in vaporization or melting of the workpiece material. When the on-time is completed, application of power is suspended during a controlled "off-time" in order to restore the insulation properties of the dielectric fluid. Decrease in on-time, in other words reduction in energy for one electric discharge, is known to contribute to improvements in surface roughness.

U.S. Pat. No. 5,149,931 discloses a power supply device for electric discharge machining, for applying a high frequency a.c. voltage from an a.c. power source to a gap, under the condition that series resonance, known as "gap resonance" is caused to occur between an capacitance component across the gap and a distributed inductance of a power supply circuit. If this gap resonance is maintained, electric discharge can occur in the gap even with high frequency a.c. voltage of 7 MHz or more. A low energy electric discharge generated in this way enables a shiny finished surface of 0.2 (m$\mu$Rmax or less. High frequency a.c. voltage of 7 MHz or more can cause electric discharge to be generated only when gap resonance is maintained. In order to maintain this gap resonance, the power supply device of U.S. Pat. No. 5,149,931 varies the frequency of the a.c. power source in response to variation in impedance of the gap. The resonant frequency F0 is expressed by the equation F0=½·$\pi$·(LmCg)$^{1/2}$. Lm represents the distributed inductance of the wiring, and Cg represents capacitance between the workpiece and the tool electrode. However, if the resonant frequency F0 changes significantly due to changes in machining area, the surface roughness will vary. For example, in an extreme case, when a workpiece changing in thickness from 1 mm to 50 mm is machined using a wire electrode, the capacitance Cg is increased by 50 times and the resonant frequency F0 varies by about ⅐. In this case, the surface roughness is increased in proportion to increase in thickness of the workpiece. The length of a wire for transmitting power into the gap also differs depending on the type of electric discharge machine, which means that the distributed inductance LM, and hence the surface roughness of the workpiece, differ depending on the type of the machine.

SUMMARY OF THE INVENTION

An object of the present invention is to provide a power supply device for an electric discharge machining apparatus for generating high frequency a.c. voltage pulses, that can further refine the surface roughness of a workpiece.

Another object of the present invention is to provide a power supply device for an electric discharge machining apparatus for generating high frequency a.c. voltage pulses without utilizing gap resonance, and that can reliably realize favorable surface roughness.

Additional objects, advantages and novel features of the invention will be set forth in the description that follows and will become apparent to those skilled in the art upon reading this description or practicing the invention. The objects and advantages of the invention may be realized and attained by practicing the invention as recited in the appended claims.

In order to achieve the above described objects, a power supply device for electric discharge machining apparatus of the present invention, for supplying power to a gap formed between a workpiece and a tool electrode, comprises a d.c. power source; a bridge circuit supplied with d.c. voltage from the d.c. power source and having switching transistors provided on each side; a control circuit for controlling the on/off switching operation of switching transistors of the bridge circuit so that a.c. voltage pulses are applied from the bridge circuit to the gap; a first resistive element for limiting current flowing when the workpiece is negatively poled and the tool electrode is positively poled; and a second resistive element, having a larger value than the first resistive element, for limiting current flowing when the workpiece is positively poled and the tool electrode is negatively poled.

The power supply device preferably also comprises an inductance element connected in parallel across the gap cancel the influence of stray capacitance of the circuit for supplying power from the d.c. power source to the gap.

Another power supply device for electric discharge machining of the present invention, for supplying power to a gap formed between a workpiece and a tool electrode comprises an a.c. power source; and a d.c. power source which is connected in series with the a.c. power source and connected to the workpiece at its negative terminal and connected to the tool electrode at its negative terminal.

BRIEF DESCRIPTION OF THE DRAWINGS

The accompanying drawings, which are incorporated in, and form a part of the specification, illustrate embodiments of the present invention and, together with the description, serve to explain the principles of the invention. In the drawings:

FIG. 1 is a circuit diagram showing a first embodiment of a power supply device of the present invention;

FIGS. 2A, 2B, 2C and 2D are timing charts showing operation of the power supply device of FIG. 1;

FIG. 3 is a drawing showing a roughness curve of the surface of a workpiece that has been machined using the power supply device of FIG. 1;

FIG. 4 is a circuit diagram showing a second embodiment of a power supply device of the present invention;

FIGS. 5A, 5B, 5C and 5D are timing charts showing operation of the power supply device of FIG. 4;

FIG. 6 is a drawing showing an electrically equivalent circuit of the power supply device of FIG. 4;

FIG. 7A is a drawing showing a no-load voltage waveform applied to a machining gap using the power supply device of FIG. 4;

FIG. 7B is a drawing showing a no-load voltage waveform applied to a machining gap using the power supply device of FIG. 1;

FIG. 8 is a graph plotting the relationship between workpiece thickness and surface roughness of a workpiece that has been electric discharge machined;

PREFERRED EMBODIMENTS OF THE PRESENT INVENTION

Figure 9:
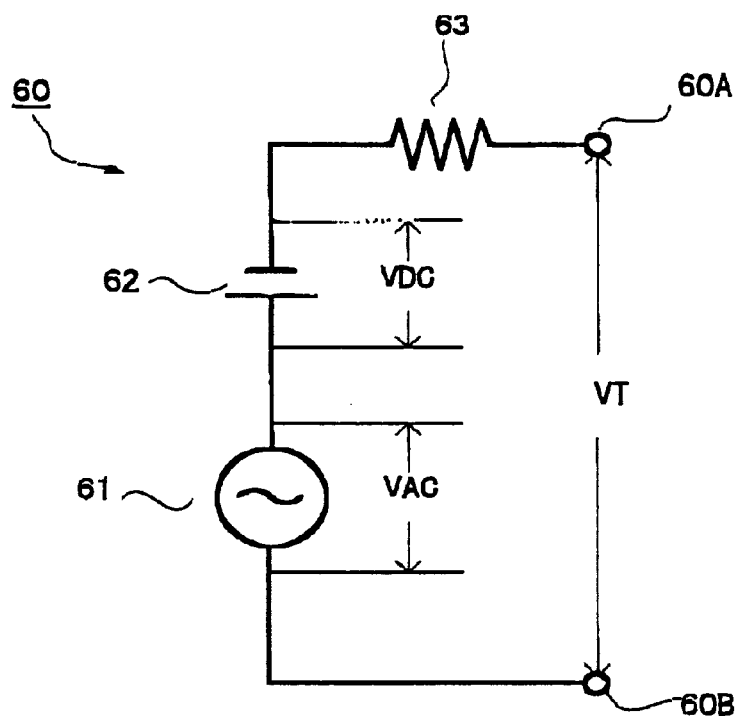
FIG. 9 is a circuit diagram showing a third embodiment of a power supply device of the present invention.

A first embodiment of a power supply device of the present invention will now be described with reference to FIGS. 1, 2A, 2B 2C, 2D and 3.

FIG. 1 shows a power supply device 1 for an electric discharge machining apparatus, for generating a.c. voltage pulses from a d.c. power source for causing reduced surface roughness of a workpiece 4. The power supply device 1 comprises a 45V d.c. power source 9 and a bridge circuit 10. As shown in the drawings, the bridge circuit 10 comprises switching transistors 11, 12, 13 and 14 connected in series so as to form four successive nodes 10A, 10B, 10C and 10D. 25Ω current limiting resistors 15 and 18 are respectively connected across nodes 10A and 10C, and nodes 10B and 10D. 5Ω current limiting resistors 16 and 17 are respectively connected across nodes 10A and 10D, and nodes 10B and 10C. In this embodiment, the resistor 15 has the same value as the resistor 18, the resistor 16 has the same value as the resistor 17, and the total resistance value of the resistors 15 and 18 is set to be larger than the total resistance value of resistors 16 and 17. The nodes 10A and 10B constitute an input section of the bridge circuit 10, while the nodes 10C and 10D constitute an output section, A d.c. voltage E is applied to the input section and an a.c. voltage pulse V1 is obtained from the output section. The a.c. voltage pulse V1 is applied as a machining voltage V to a gap G formed between the workpiece 3 and the wire tool electrode 4, via a low capacitance line 8. As a result, if electric discharge is generated in the gap G, current I flows through the gap G. Generally, electrical components such as the power source 9, bridge circuit 10 and control circuit 20 are housed in a cabinet, together with a computer, and are electrically connected to mechanical sections of the electric discharge machine using a suitable conductor such as a low capacitance line 8. Reference numeral 20 denotes a control circuit for controlling the on/off switching operation of the switching transistors 11, 12, 13 and 14 provided on each sides of the bridge circuit 10. The control circuit 20 comprises a pulse generator 21 and an inverter 22. As shown in FIG. 2A, the pulse generator 21 generates a 5 MHz gate control pulse signal PA. As shown in FIG. 2B, the inverter 22 generates a gate control pulse signal PB by level inversion of the pulse signal PA. The pulse signal PA is applied to the gates of switching transistors 11 and 14, while the pulse signal PB is applied to the gates of switching transistors 12 and 13. Accordingly, switching transistor 11 is turned on and off at the same time as switching transistor 14, while switching transistor 12 is turned on and off at the same time as switching transistor 13. As a result, the bridge circuit 10 alternately generates a straight polarity pulse voltage, namely a voltage such that the workpiece 3 is positively poled and the wire electrode 4 is negatively poled, and a reverse polarity pulse signal, namely a voltage such that the workpiece 3 is negatively poled and the wire electrode 4 is positively poled. The total resistance value of resistors 15 and 18 is set to be larger than the total resistance value of resistors 16 and 17 so that the current flowing through the gap G when the bridge circuit 10 is outputting a straight polarity voltage is smaller than the current flowing through the gap G when the bridge circuit 10 is outputting a reverse polarity voltage. As a result, different charging time constants are applied to stray capacitance existing mainly in the power supply line 8, and a straight polarity voltage applied to the gap G is smaller than a reverse polarity voltage. FIGS. 2C and 2D respectively show a voltage V applied across the gap G and current I flowing through the gap G. Here, electric discharge is only generated in the gap G during time periods T3, T4, T5 and T6. The power ratio allotted to the workpiece 3 when electric discharge is generated using straight polarity is larger than that using reverse polarity. This means that electric discharge machining with straight polarity can be considered to determine surface roughness of the workpiece 3. According to the experience of the applicant, it appears that the degree of surface roughness brought about by electric discharge using straight polarity is 1.5–2 times the degree of surface roughness brought about by electric discharge using reverse polarity. In the power supply device of FIG. 1, as shown in FIG. 2D, the current I flowing through the gap at the time of straight polarity is smaller than the current flowing at the time of reverse polarity, and so the machined surface roughness of the workpiece 3 becomes small.

FIG. 3 shows a surface roughness curve of a tungsten carbide workpiece 3 having a thickness of 10 mm which was machined using the power supply device 1. At the time of straight polarity a no-load voltage being applied when no discharge is occurring was 15V, and at the time of reverse polarity the no-load voltage was 40V.

A second embodiment of a power supply device of the present invention will now be described with reference to FIGS. 4, 5A, 5B, 5C, 5D, 6, 7A, 7B and 8.

The power supply device 2 of FIG. 4 is the same as the power supply device 1 of FIG. 1, except for a coil 30 connected in parallel with the gap G, and elements that are the same as those in FIG. 1 are designated by the same reference numerals. FIGS. 5A, 5B, 5C and 5D are the same as FIGS. 2A, 2B, 2C and 2D, and respectively show pulse signal PA, pulse signal PB, voltage V being applied across the gap G and current I flowing through the gap G. When the gap G is viewed from the output terminals 10C and 10D of the bridge circuit 10, stray capacitance exists mainly in the power supply line 8. When no electric discharge occurs though voltage V is applied across the gap G, namely in a no-load state, different resistances R are alternately connected in series with this stray capacitance. As a result, the no-load voltage V is different depending on whether the gap G is subjected to straight polarity or reverse polarity. The difference between these no-load voltages V causes the undesirable phenomenon of brass, being a component of the wire electrode 4, sticking to the surface of the workpiece 3. For example, in some medical equipment components there are cases where products having copper stuck to them are classed as defective products. The coil 30 and a stray capacitance existing mainly in the power supply line 8 constitute a parallel resonant circuit. The inductance value of the coil 30 is established based on the value of the stray capacitance and the frequency of the pulse signal PA so that the resonance frequency of the parallel resonant circuit substantially matches the frequency of the pulse signal PA. Referring to FIG. 6 showing an electrically equivalent circuit of the power supply device 2 of FIG. 4, the method of determining the inductance value of the coil 30 will be described. In FIG. 6, R represents an internal resistance value of the bridge circuit 10, C1 represents a capacitance value of the stray capacitance, L1 represents an inductance value of the distributed capacitance attributable to the wiring, L2 represents an inductance value of the coils 30 and Z1 represents the parallel resonant circuit. If, for example, the value of C1 is made approximately 500PF with the frequency of pulse signal PA, namely the frequency f0 of a.c. voltage pulses V1, at 5 MHz, from the equation $F0 = \frac{1}{2} \cdot \pi \cdot (L2 \cdot C1)^{1/2}$, the value of L2 is preferably made 2 μH. In this way, when the gap G is viewed from the output terminals 10C and 10D of the bridge circuit 10 impedance becomes only the resistance value of the gap G. Accordingly, as shown in FIG. 5C, in the no-load state the output voltage pulse V1 of the bridge circuit 10 is applied more or less as it is to the gap G as a machining voltage V even if resistance inserted between the d.c. power source 9 and the gap G varies.

FIG. 7A is a drawing showing the waveform of a no-load voltage waveform applied to the gap G using the power supply device 2 of FIG. 4, and FIG. 7A is a drawing showing the waveform of a no-load voltage waveform applied to the gap G using the power supply device 1 of FIG. 1. From a comparison of these no-load voltage waveforms it will be understood that insertion of the coil 30 significantly improves voltage bias.

FIG. 8 is a graph plotting the relationship between thickness of the workpiece 3 and surface roughness of the workpiece 3 that has been electric discharge machined using the power supply device 2. At this time, the no-load voltage is 40V regardless of whether it is at the time of straight polarity or reverse polarity. As will be understood from FIG. 8, the surface roughness hardly changes even if the thickness of the workpiece 3 varies. It was also confirmed that brass was not stuck to the workpiece.

A third embodiment of a power supply device of the present invention will now be described with reference to FIGS. 9 and 10.

Figure 10:
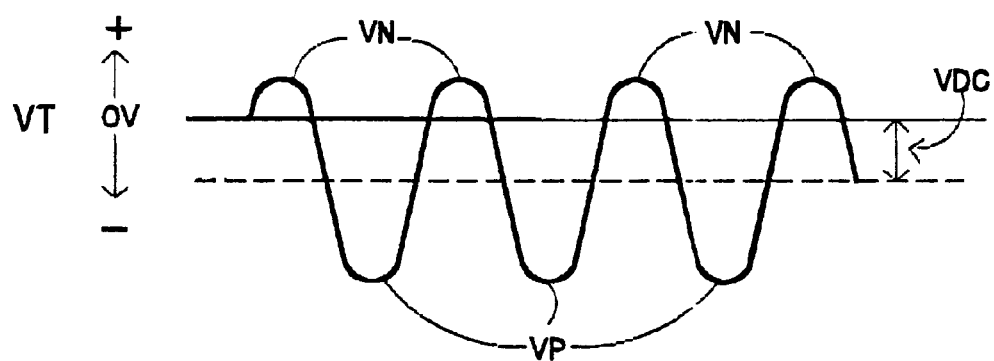
FIG. 10 is a drawing showing a no-load voltage waveform of the power supply device of FIG. 9.

The power supply device 60 of FIG. 9 comprises an a.c. power source 61 for outputting an a.c. voltage VAC, a d.c. power source 62 connected in series with the a.c. power source 61 for adding a d.c. bias to the a.c. voltage VAC, and a current limiting resistor 63 connected in series with the d.c. power source 62. Output terminals 60A and 60B are, respectively, connected to a workpiece 3 and a wire electrode 4 through a low capacitance line 8, similarly to the power supply device 1 of FIG. 1. A a.c. voltage VT output from the output terminals 60A–60B is applied to the gap G as a machining voltage V. Since the a.c. voltage VAC is biased in a negative direction in accordance with the d.c. output voltage VDC of the d.c. power source 62, as shown in FIG. 10, a positive direction voltage level VP of the a.c. voltage VT becomes low and a negative direction voltage level VN of the a.c. voltage VT becomes high. As a result, the level of voltage V becomes high at the time of reverse polarity, the level of voltage V becomes low at the time of straight polarity, and it is possible to perform excellent finishing machining, similar to the case where the power supply device 1 of FIG. 1 was used.

The foregoing description of preferred embodiments of the present invention has been presented for the purposes of illustration and description. It is not intended to be exhaustive or to limit the invention to the precise form enclosed, and obviously many modifications and variations are possible in light of the above teaching. It is intended that the scope of the invention be defined by the claims attached hereto.

What is claimed is:

1. A power supply device for electric discharge machining apparatus, for supplying power to a gap formed between a workpiece and a tool electrode, comprising:

a d.c. power source;

a bridge circuit supplied with d.c. voltage from the d.c. power source and having switching transistors provided on each side;

a controller for controlling the on/off switching operation of switching transistors of the bridge circuit so that a.c. voltage pulses are applied from the bridge circuit to the gap;

a first resistive element for limiting current flowing when the workpiece is negatively poled and the tool electrode is positively poled; and a second resistive element, having a larger value than the first resistive element, for limiting current flowing when the workpiece is positively poled and the tool electrode is negatively poled.

2. The power supply device of claim 1, further comprises an inductance element connected in parallel across the gap to cancel the influence of stray capacitance of the circuit for supplying power from the d.c. power source to the gap.

* * * * *